United States Patent [19]
Abbe

[11] 3,775,679
[45] Nov. 27, 1973

[54] APPARATUS AND METHOD FOR DIRECT READOUT OF CAPACITIVELY GAUGED DIMENSIONS

[75] Inventor: Robert C. Abbe, Newton, Mass.

[73] Assignee: ADE Corporation, Watertown, Mass.

[22] Filed: Dec. 9, 1971

[21] Appl. No.: 206,364

[52] U.S. Cl. ............................................. 324/61 R
[51] Int. Cl. .............................................. G01r 27/26
[58] Field of Search .............. 324/60 C, 60 R, 57 R, 324/61 R

[56] References Cited
UNITED STATES PATENTS

| | | | |
|---|---|---|---|
| 2,570,218 | 10/1951 | Draganjac | 324/61 R X |
| 3,012,192 | 12/1961 | Lion | 324/60 R X |
| 3,034,044 | 5/1962 | Konigsberg | 324/57 R |
| 3,260,934 | 7/1966 | Lion | 324/57 R |
| 3,424,977 | 1/1969 | Krobath | 324/61 R |
| 3,445,763 | 5/1969 | Harris, Jr. | 324/57 R |
| 3,497,801 | 2/1970 | Clower et al. | 324/60 R |
| 3,577,072 | 5/1971 | Miller | 324/60 C |
| 3,639,832 | 2/1972 | Goebbels | 324/60 R X |
| 3,688,190 | 8/1972 | Blum | 324/61 R |
| 3,688,206 | 8/1972 | Eide | 324/60 R X |

Primary Examiner—Stanley T. Krawczewicz
Attorney—Yardley Chittick et al.

[57] ABSTRACT

An electronics system and method for processing the output of a dimension sensing capacitive gauge or probe having a measured capacitance between electrodes. Control of the capacitive gauge's output through control of its excitation allows a parameter of the excitations output to be used as an indication directly proportional to a dimension, typically electrode separation, which varies inversely with the capacitance between the electrodes. An output from a second similar gauge is used to deflect a meter for a direct indication of the dimension. Alternatively a second excitation for the second gauge is provided with its output used to control the first excitation whereby the frequency ratio of the two excitations provides a direction indication of the dimension and is easily digitized. Environmentally induced changes in either gauge are balanced by proximity of the gauges and the excitation amplitude is regulated.

13 Claims, 3 Drawing Figures

PATENTED NOV 27 1973   3,775,679

INVENTOR
ROBERT C. ABBE

BY
Charles E. Ofund
ATTORNEYS 3,775,679

APPARATUS AND METHOD FOR DIRECT READOUT OF CAPACITIVELY GAUGED DIMENSIONS

BACKGROUND OF THE INVENTION

Automatic non-contact gauging of distances or dimensions can be done by sensing a capacitance that varies inversely as the distance or dimension varies. The output of many gauges, particularly highly accurate ones of the type described in my copending application Ser. No. 64,240, produce an output signal which varies with the capacitance being sensed and inversely with the distance or dimension ultimately sought. This fact makes direct visual display and further use of the distance information impossible without further electronic processing.

In processing the output of the gauge it is desirable to limit the amount of circuitry employed because of the potential for the introduction of circuit inaccuracies. One way that it has been found possible to both limit the circuity and control the accuracies is to use a closed-loop system wherein certain variables of the system capable of introducing error are eliminated.

Because of the accuracy of the gauges normally in use with this invention and because of a desire to be easily compatible with computer circuitry it is convenient to have a digital readout. This kind of output has the further advantage of indicating accurately over a greater range. By measuring the frequency of a controlled excitation, it has been found possible to achieve this form of readout.

It is thus a general object of the present invention to provide simple and accurate processing electronics for a capacitance sensing dimension indicating gauge which produces an output signal varying directly with the dimension being gauged and inversely with the capacitance being sensed.

It is a specific object of the present invention to provide simple and accurate processing electronics for a capacitance sensing dimension indicating gauge which has feedback control over the output of the gauge by varying a parameter of the excitation and then utilizes the excitation for an indication of the dimension being gauged. It is a further specific object of the present invention to provide simple and accurate processing electronics for a capacitance sensing dimension indicating gauge which provides a digital readout directly varying with the dimension being gauged.

BRIEF SUMMARY OF THE INVENTION

In a preferred embodiment of this invention it will be used in conjunction with a capacitance sensing dimension measuring gauge of the type shown in my copending application Ser. No. 64,240. The output of this type of gauge is an electric signal proportional to the excitation frequency and amplitude and to the difference in capacitance between the capacitance being sensed and a reference capacitance. This difference represents a dimension being gauged. The preferred embodiment regulates the output signal and maintains it equal to a control signal by closed-loop feedback control over the excitation. The excitation is then used to indicate directly the dimension being measured.

In one alternative of this embodiment the control signal is a constant and the excitation is then fed to a dummy gauge whose output varies directly with the dimension being measured.

In a further alternative of this embodiment a dummy gauge is fed by a second source of excitation and the output of this dummy gauge used as the control signal with the frequency of the excitation for the dimension gauge controlled by it through the feedback circuit. A counter is gated to register the number of cycles or polarity reversals in the excitation for the dimension gauge during a preselected number of cycles or reversals in the excitation of the dummy gauge. The number counted represents the dimension being gauged directly.

This invention can be better understood from the following detailed description and accompanying drawings of which:

Figure 1:
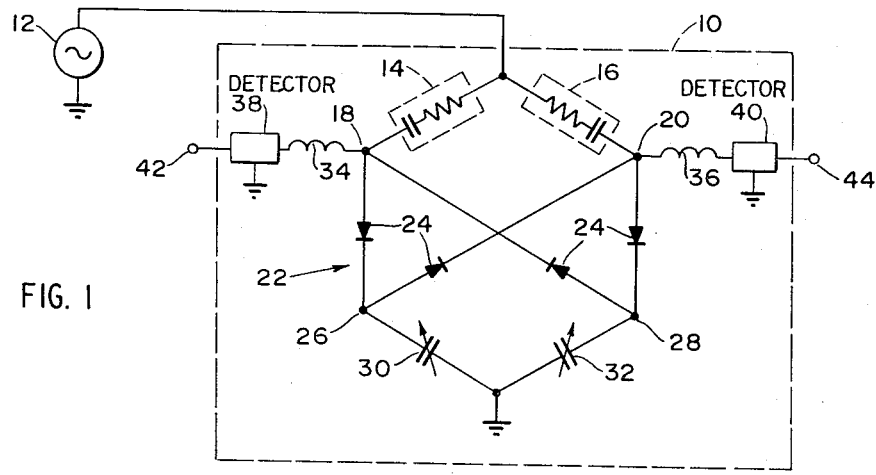
FIG. 1 is a partial block and schematic diagram of a dimension gauge typically used with the circuitry of this invention.

Referring to FIG. 1 there is shown in partial block and schematic diagram form a capacitance sensing dimension gauge 10 fed by a source of alternating electric excitation 12 between a ground terminal and a high side with the high side electrically connected to the gauge 10 to one terminal of first and second DC blocking impedances 14 and 16 respectively. The other terminals of the impedances 14 and 16 are electrically connected to junctions 18 and 20 of a diode matrix 22 composed of four series joined matched diodes 24 oriented for conduction in the same direction in a closed conduction path. The junctions 18 and 20 are connections between diodes in the matrix 22 which are separated by two diodes in either direction. Two remaining junctions 26 and 28 between diodes in the matrix 22 are electrically connected to one terminal of variable sensing and reference capacitances 30 and 32 respectively with the other terminals thereof grounded. The sensing capacitance typically includes the capacitance being sensed for an indication of a dimension. From the junctions 18 and 20 respective low-pass filters 34 and 36, shown as inductances, conduct to detectors 38 and 40 respectively which convert the current through the filters 34 and 36 into an output signal at output terminals 42 and 44. Detectors 38 and 40 may be amplifiers or resistances to ground or any other electronics performing the indicated function.

An unbalance in the value of the capacitances 30 and 32 produces unequal half cycles of opposite polarity in the currents through the impedances 14 and 16 which would result in charge accumulation except that this excess charge is conducted to ground through the detectors 38 and 40. The net current through either of the detectors 38, 40 is proportional of the unbalance between the capacitances 30 and 32 (regardless of the amount of unbalance) as well as to the frequency and amplitude of the excitation from source 12.

Of particular usefulness is the case where impedances 14 and 16 have a value substantially lower than the impedance of capacitances 30 and 32. The unctions 26 and 28 are kept at approximately equal instantaneous potential minimizing any current flow between them through stray capacitance.

The filters 34 and 36 may also be connected to the junctions 26 and 28 but are then capable of creating stray capacitance that alters the indicated unbalance between capacitances 30 and 32.

Figure 2:
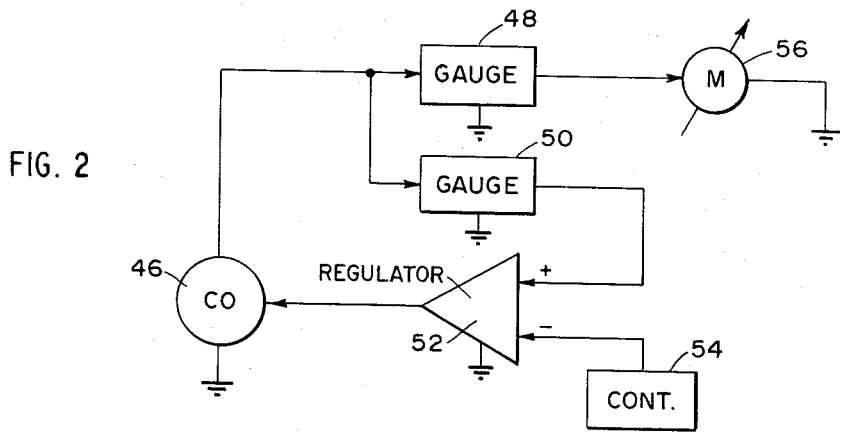
FIG. 2 is a block diagram of preferred processing electronics in one alternative.

Referring to the block diagram of FIG. 2, a controllable source or oscillator 46 is shown supplying alternating electric excitation between ground and a high side connected to excitation inputs of gauges 48 and 50, 1 gauge 48 acting as a dummy gauge. The gauges 48 and 50 may be the same as the gauge 10 in FIG. 1 or any other capacitance sensing gauge giving an output signal varying directly with the sensed capacitance, excitation frequency, and excitation amplitude.

An output of the gauge 50 having these characteristics (such as the outputs 42 and 44 in FIG. 1) is connected to an input of a regulator 52. A control signal from control source 54 is differentially applied to the regulator 52 and a output of the regulator 52 is carried to a control input of the source 46. Varying the signal level of the control input to source 46 varies the amplitude and/or frequency of the excitation from the source 46 to gauges 48 and 50. Regulator 52 produces a signal at its output, conducted to the control input of the source 46, which maintains the input signals to the regulator 52 equal. Conveniently, regulator 52 could be an integrator producing at its output a time integral of the difference between its inputs.

Noting that the output signals of the gauges 48 and 50 are proportional to the frequency and amplitude of source 46 and to the difference in capacitance between the sensing and reference capacitances in each gauge the following equations apply:

$S_{50} \alpha\ VFC_{50} = K$ $S_{48} \alpha\ VFC_{48}$; then substituting for $VF$ $$S_{48} \alpha\ KC_{48}/C_{50} = KC_{48}\ D/EA \qquad (1)$$

where:
- $S_{50}$ is the signal output of gauge 50;
- $S_{48}$ is the signal output of gauge 48;
- $V$ is the amplitude of source 46;
- $F$ is the frequency of source 46;
- $C50$ is the difference between sensing and reference capacitances of gauge 50 and is assumed to vanish for infinite D (otherwise a constant additive term is necessary in these equations);
- $C48$ is the difference between sensing and reference capacitances of gauge 48 and may be fixed;
- $K$ is the constant control signal from source 54;
- $D$ is the dimension being gauged;
- $E$ is the permittivity of the gauge 50's sensing capacitance; and
- $A$ is the area through which the gauge 50's sensing capacitance exists.

The output signal is thus proportional to the dimension D being gauged (or varies directly with it in the case of a constant additive term). A meter 56 may be used to indicate this signal.

Figure 3:
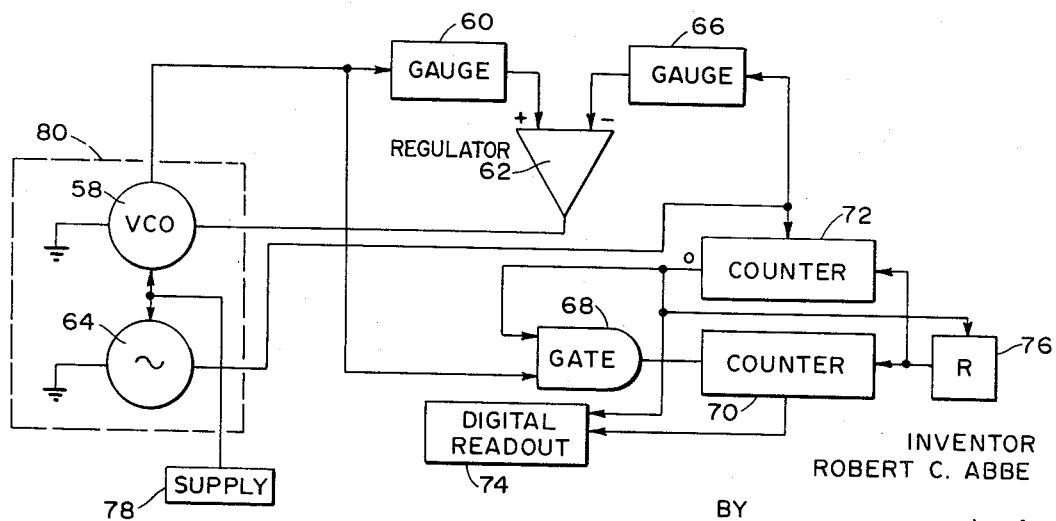
FIG. 3 is a block diagram and of preferred processing electronics in a second alternative for this invention.

Referring now to FIG. 3 there is shown in block diagram exemplary processing electronics providing a digital readout of a dimension being gauged. A voltage controlled oscillator 58 is shown providing excitation to a guage 60 which again may be a gauge of the FIG. 1 type having the output properties indicated. The gauge 60 has sensing and reference capacitances with at least the sensing capacitance varying inversely with the dimension being gauged. A second oscillator 64 provides excitation to a dummy gauge 66 which has sensing and reference capacitances also. A regulator 62 is fed the output signal of gauge 60 on one input and the output signal of gauge 66 on a differential input. The output of regulator 62 is conducted as a control signal to a control input of oscillator 58 where its level varies the frequency of oscillator 58. Regulator 62 operates to maintain its two inputs equal by controlling the frequency of oscillator 58 and correspondingly the frequency sensitive output of gauge 60.

The excitation from oscillator 58 is also fed to a gate which either blocks or conducts this excitation to a counter 70 which is digitally advanced by each cycle or half cycle in the oscillator 58 excitation. A gating signal is supplied to the gate 68 by a settable count indicator 72 which receives excitation from the oscillator 64 and resettably counts the number of cycles or half cycles in that excitation. When the count in indicator 72 reaches a selectable number it outputs a signal to the gate 68 to block excitation from oscillator 58 passing to counter 70. While indicator 72 is counting the signal it outputs to gate 68 to enable conduction of the excitation of oscillator 58 to counter 70.

A digital readout 74 is also fed the output of indicator 72. When the indicator 72 reaches the selectable count number its output causes readout 74 to record and display digitally the count accumulated in the counter 70 until the next signal from indicator 72. A delayed reset 76 receives this same output from indicator 72 and signals after a short delay for the indicator 72 and counter 70 to be reset.

In operation this electronics produces a count in counter 70 of the number of cycles or half cycles from oscillator 58 that occur during a selectable number of cycles or half cycles from oscillator 64. The counter 70 thus registers and the readout 74 displays the ratios of these two frequencies.

Mathematically, and using the same notation as above:

$S_{60} = V_{58}\ F_{58}\ C_{60}$ $S_{60} = V_{64}\ F_{64}\ C_{66} = V_{58}\ F_{58}\ C_{60}$ $$F_{58}/F_{64} = V_{64}\ C_{66}/V_{58}\ C_{60} = C_{66}\ V_{64}/V_{58}\ D/EA \qquad (2)$$

where:
- $V$ and $F$ are the voltage and frequency outputs of the oscillators indicated in the subscript;
- $S$ is the output signal of the gauge indicated by the subscript; and
- $C$ is the difference in capacitance between the sensing and reference capacitances of the indicated subscript;

It will be noted that the readout 74 displays a number proportional to the right side of equation (2) and thus proportional to D, the dimension being gauged.

$F_{64}$ may vary without any loss in accuracy provided it varies slowly compared to the time for each count. $V_{58}$ and $V_{64}$ may vary also as long as their ratio is the same. The ratio is kept constant and this may be accomplished by supplying them with power from the same power supply 78 and/or by keeping them in the same environment 80. $C_{66}$ can be kept constant by conventional techniques or be allowed to vary representing a parameter it is desired to have affect the readout indication.

It is possible by exchanging the positions of the gauges 60 and 66 to produce an output in readout 74 varying inversely to the one in equation (2).

Having now described an exemplary preferred embodiment it is desired to cover all modifications and al-

What is claimed is:

1. A method of electronically obtaining an output proportional to a physical dimension from a capacitance sensing distance gauge which operates by:
   a. applying an alternating electric excitation from a first source through a first measuring circuit across a first non-conducting gap etween a pair of first electric conductors having a physical dimension therebetween inversely varying with the capacitance between said first electric conductors; and
   b. deriving in said first measuring circuit a first signal from the response of said electric excitation across said first non-conducting gap, said first signal tending to vary with the capacitance between said first electric conductors, said method comprising the steps of:
      1. controlling a parameter of the output of said source to maintain said first signal equal to a control signal; and
      2. developing a second signal varying with a parameter of the output of said source which second signal varies with the separation being sensed.

2. The method of claim 1 wherein said control signal is constant and said step of developing said second signal is further characterized by the steps of:
   a. applying alternating electric excitation from said first source through a second measuring circuit across a second non-conducting gap between a pair of second electrical conductors; and
   b. deriving said second signal from the response of the alternating electric excitation across said second non-conducting gap, said second signal varying inversely with the capacitance between said first electric conductors.

3. The method of claim 1 wherein the parameter of the output of said source which is controlled is frequency and said step of developing said second signal further includes the steps of:
   a. applying alternating electric excitation from a second source through a second measuring circuit across a second non-conducting gap between a pair of second electric conductors;
   b. deriving in said second measuring circuit said control signal from the response of the alternating electric excitation to said second electric conductors; and
   c. counting the number of polarity reversals of the excitation from said first source during a selected number of polarity reversals of the excitation from said second source, the number counted being inversely proporational to the capacitance between said first electric conductors.

4. The method of claim 3 further including the step of maintaining the ratio of excitation amplitudes from said first and second sources equal to a preset number.

5. Apparatus for giving an output varying with the separation between a pair of first electric conductors comprising:
   a. a pair of first electric conductors with a non-conducting gap therebetween;
   b. a first source of alternating electric excitation;
   c. means for applying excitation from said first source across said first pair of electric conductors;
   d. means for deriving a first signal representative of the response of said first electric conductors to the excitation from said first source and tending to vary with the capacitance between said first electric conductors;
   e. means for controlling a parameter of the excitation of said first source to maintain said first signal equal to a control signal; and
   f. means for developing a second signal varying with the controlled parameter of said first source.

6. The apparatus of claim 5 wherein:
   a. said control signal is a constant value; and
   b. said means for developing said second signal further includes:
      i. means for applying excitation from said first source across a pair of second electric conductors separated by a non-conducting gap; and
      ii. means for deriving a second signal representative of the response of said second electric conductors to the excitation from said first source and tending to vary with the capacitance between said second electric conductors.

7. The apparatus of claim 5 wherein:
   a. said parameter controlled is frequency; and
   b. said means for developing said second signal further includes:
      i. a second source of alternating electric excitation;
      ii. means for deriving said control signal as a signal proportional to the excitation amplitude and frequency of said second source; and
      iii. means for counting the number of polarity reversals in the excitation from said first source during a selected number of polarity reversals of the excitation from said second source, the number counted being inversely proportional to the capacitance between said first electric conductors.

8. The apparatus of claim 7 further including means for maintaining the ratio of potentials from said first and second sources equal to a preset number.

9. The apparatus of claim 5 further characterized by having:
   a. a first reference capacitance;
   b. means for applying excitation from said first source across said first reference capacitance, said first signal as derived by said means for deriving said first signal being representative of the difference in the response of said first reference capacitance and the capacitance between said first electrical conductors.

10. The apparatus of claim 9 wherein the parameter controlled is frequency and wherein said means for developing said second signal further includes:
    a. a second source of alternating electric excitation;
    b. a pair of comparison capacitances differing from each other by a finite capacitance;
    c. means for applying excitation from said second source to each of said pair of comparison capacitances; and
    d. means for deriving said control signal as a signal representative of the capacitance difference between the capacitances of said pair of comparison capacitances.

11. The apparatus of claim 10 wherein said means for developing a second signal further includes means for counting the number of polarity reversals of the excitation from said first source during a selected number of polarity reversals of the excitation from said second source, the number counted being inversely proportional to the capacitance between said first electric conductors.

12. The apparatus of claim 11 further including means for maintaining the ratio of amplitudes from said first and second soruces equal to a preset number.

13. The apparatus of claim 5 further characterized by having a first bridge composed of:
   a. first and second DC blocking impedances each connected electrically at one terminal thereof to a first excitation terminal of said first source;
   b. a first reference capacitance connected at one terminal both to one of said first electrical conductors and to the second excitation terminal of said source;
   c. means for conducting excitation from said first source through said first and second DC blocking impedances to the other terminal and other conductor respectively of said first reference capacitance and said first electrical conductors during one polarity of excitation from said first source and to the other conductor and other terminal respectively of said first electrical conductors and first reference capacitance during the other polarity; and
   d. means for conducting charge build-up across said DC blocking impedances to the second terminal of said first source, said first signal being the average current through said means for conducting charge.

* * * * *